(12) United States Patent
Elnajjar et al.

(10) Patent No.: US 12,529,346 B1
(45) Date of Patent: Jan. 20, 2026

(54) SYSTEM AND A METHOD FOR REDUCING HYDROGEN KNOCKING IN A HYDROGEN INTERNAL COMBUSTION ENGINE

(71) Applicant: United Arab Emirates University, Al Ain (AE)

(72) Inventors: Emad Elnajjar, Al Ain (AE); Sanad Purayil, Al Ain (AE)

(*) Notice: Subject to any disclaimer, the term of this patent is extended or adjusted under 35 U.S.C. 154(b) by 0 days.

(21) Appl. No.: 19/091,071

(22) Filed: Mar. 26, 2025

(51) Int. Cl.
*F02D 41/00* (2006.01)
*F02B 29/04* (2006.01)
*F02D 41/14* (2006.01)

(52) U.S. Cl.
CPC ...... *F02D 41/0007* (2013.01); *F02B 29/0412* (2013.01); *F02B 29/0493* (2013.01); *F02D 41/0027* (2013.01); *F02D 41/1498* (2013.01); *F02D 2200/0414* (2013.01)

(58) Field of Classification Search
CPC ............. F02D 41/0007; F02D 41/0027; F02D 41/1498; F02D 2200/0414; F02B 29/0412; F02B 29/0493; F02B 43/10; F02M 21/0206
See application file for complete search history.

(56) References Cited

U.S. PATENT DOCUMENTS

| 7,980,220 B2 * | 7/2011 | Boyer ............... F02M 35/1085 123/90.15 |
| 2014/0356744 A1 * | 12/2014 | McAlister .......... H01M 8/0618 422/162 |

FOREIGN PATENT DOCUMENTS

CN 119213209 A * 12/2024 ......... F02D 41/0027

OTHER PUBLICATIONS

Translation CN-119213209-A (Year: 2025).*

* cited by examiner

*Primary Examiner* — J. Todd Newton

(57) ABSTRACT

The present disclosure is directed to a system for reducing hydrogen knocking in a hydrogen internal combustion engine [H2ICE]. The hydrogen internal combustion engine is coupled to an intake manifold, an exhaust manifold, a forced induction unit, and a cooling unit. The cooling unit includes a vortex cooling device and a hybrid cooling device. The system includes a control unit communicatively coupled to the intake manifold, the exhaust manifold, the forced induction unit, and the cooling unit. The control unit configured to route compressed air from the forced induction unit to the vortex cooling device. The vortex cooling device is configured to cool the compressed air and supply cold air to the intake manifold of the hydrogen internal combustion engine. Further, the present disclosure is also directed to a hydrogen internal combustion engine unit and a method for reducing hydrogen knocking in a hydrogen internal combustion engine.

6 Claims, 10 Drawing Sheets

SYSTEM AND A METHOD FOR REDUCING HYDROGEN KNOCKING IN A HYDROGEN INTERNAL COMBUSTION ENGINE

TECHNOLOGICAL FIELD

The present disclosure in general relates to the field of internal combustion engines. The present disclosure is further directed towards a hydrogen internal combustion engine (H2ICE). The present disclosure is also directed towards a system and a method for reducing hydrogen knocking in a H2ICE.

BACKGROUND

The information in this section merely provides background information related to the present disclosure and may not constitute prior art(s) for the present disclosure.

With increasing global population, energy demand is rising exponentially. Currently, majority of energy is supplied by the oil industry, with approximately 30% being consumed by the transportation sector. Such excessive dependency on oil or gasoline products has significantly contributed to pollution, which in-turn adversely impacts human health. To cater to such urgent need in industrial change, as specifically in the transportation section, conventional fuels such as petrol or diesel are either replaced or operated with green fuels such as hydrogen. Usage of hydrogen as fuel offers several advantages including renewability, non-polluting properties, high heating value, superior diffusivity, a high laminar flame speed, and among others, which promote such fuel in the transportation sector.

Further, growing interest in hydrogen as one of the fuels for vehicles has led to development in Hydrogen-fueled internal combustion engines (H2ICE). However, in conventional H2ICE, the hydrogen, by virtue of its inherent physicochemical properties is susceptible to abnormal combustion phenomena, such as backfire and knocking [also referred to as 'combustion knock']. Such backfire and knocking are usually observed at high equivalence ratio [i.e., with more hydrogen and gasoline present in the mixture than air in the cylinder of the engine; 'rich' mixture], which may also cause damage to the H2ICE. The phenomena of backfire and knocking is resultant of to several factors such as, but not limited to, low ignition energy of hydrogen, high diffusivity of hydrogen when compared to air, and/or high adiabatic flame temperature. One of the causes for backfire and knocking is high temperature of unburnt fuel in the cylinder of the H2ICE. Combustion of a homogeneous mixture of air and fuel [gasoline+hydrogen] increases pressure and temperature of the unburnt fuel, making it prone to self-ignition. Moreover, the high adiabatic flame temperature elevates temperature of the unburnt fuels and may promote formation of hotspots within the cylinder of the H2ICE, which serve as ignition sources.

Furthermore, research studies and existing literature showcase a significant correlation between knocking and intake air temperature, with higher intake air temperatures leading to higher chances of knocking. Accordingly, there exists a need for overcoming one or more limitations stated above and any other similar limitations associated with the H2ICE.

General Description

A first aspect of the disclosure concerns a system for reducing hydrogen knocking in a hydrogen internal combustion engine [H2ICE], [also referred to as the 'system' hereinafter]. The hydrogen internal combustion engine is coupled to an intake manifold, an exhaust manifold [not shown in the Figures], a forced induction unit, and a cooling unit. The cooling unit includes a vortex cooling device and a hybrid cooling device. The system includes a control unit communicatively coupled to the intake manifold, the exhaust manifold, the forced induction unit, and the cooling unit. The control unit configured to route compressed air from the forced induction unit to the vortex cooling device. The vortex cooling device is configured to cool the compressed air and supply cold air to the intake manifold of the hydrogen internal combustion engine. The control unit is further configured to compare temperature of the cold air discharged by the vortex cooling device, against a predefined threshold temperature. The temperature of the cold air exceeding the predefined threshold temperature causes hydrogen knocking in the hydrogen internal combustion engine. The control unit is further configured to selectively operate a hybrid cooling device. The hybrid cooling device is thermally interfaced with the vortex cooling device. The hybrid cooling device is operated upon determining that the temperature of the cold air exceeds the predefined threshold temperature. Further, operation of the hybrid cooling device is configured to reduce temperature of the cold air below the predefined threshold temperature, and thereby the hydrogen knocking in the hydrogen internal combustion engine.

According to a configuration of the first aspect, the hybrid cooling device is thermally interfaced with the vortex cooling device. The hybrid cooling device includes a first cooling device thermally interfaced with the vortex cooling device. The first cooling device includes a phase change material [PCM] enhanced with carbon nanotubes [CNT]. The phase change material enhanced with carbon nanotubes is configured to absorb heat generated along a periphery of the vortex cooling device. The hybrid cooling device further includes a second cooling device. The second cooling device includes an ethylene glycol-water cooling module thermally interfaced with the first cooling device. The ethylene glycol-water cooling module is configured to absorb heat from the phase change material enhanced with carbon nanotubes.

According to a configuration of the first aspect, the intake manifold is configured to receive hydrogen from a hydrogen supply unit.

According to a configuration of the first aspect, the forced induction unit is a turbocharger operatively coupled to the exhaust manifold of the hydrogen internal combustion engine. A drive turbine of the turbocharger is configured to be driven by exhaust gases exiting the exhaust manifold.

According to a configuration of the first aspect, the forced induction unit is a supercharger operatively coupled to the hydrogen internal combustion engine. A drive turbine of the supercharger is configured to be driven by a crankshaft of the hydrogen internal combustion engine.

According to a configuration of the first aspect, the hydrogen internal combustion engine is a hydrogen-gasoline dual-fuel engine. The hydrogen internal combustion engine is a spark-ignition engine.

A second aspect of the disclosure concerns, a method for reducing hydrogen knocking in a hydrogen internal combustion engine [H2ICE] [also referred to as the 'method' hereinafter]. The hydrogen internal combustion engine is coupled to an intake manifold, an exhaust manifold, a forced induction unit, and a cooling unit. The cooling unit includes a vortex cooling device and a hybrid cooling device. The method includes routing, by a control unit, compressed air from the forced induction unit to the vortex cooling device.

The compressed air is cooled down in the vortex cooling device and the cold air is supplied to the intake manifold of the hydrogen internal combustion engine. The method further includes comparing, by the control unit, temperature of the cold air discharged by the vortex cooling device against a predefined threshold temperature. The temperature of the cold air exceeding the predefined threshold temperature causes hydrogen knocking in the hydrogen internal combustion engine. The method further includes selectively operating, by the control unit, a hybrid cooling device. The hybrid cooling device is thermally interfaced with the vortex cooling device. The hybrid cooling device is operated upon determining temperature of the cold air exceeding the predefined threshold temperature. Operation of the hybrid cooling device is configured to reduce temperature of the cold air below the predefined threshold temperature.

According to a configuration of the second aspect, selectively operating the hybrid cooling device includes operating, a first cooling device thermally interfaced with the vortex cooling device. The first cooling device includes a phase change material [PCM] enhanced with carbon nanotubes [CNT]. The PCM is configured to absorb heat generated along a periphery of the vortex cooling device. In the embodiment, selectively operating the hybrid cooling device further includes operating a second cooling device. The second cooling device includes an ethylene glycol-water cooling module thermally interfaced with the first cooling device. The ethylene glycol-water cooling module is configured to absorb heat from the phase change material enhanced with carbon nanotubes.

According to a configuration of the second aspect, the method includes supplying hydrogen to the intake manifold from a hydrogen supply unit.

According to a configuration of the second aspect, the method includes regulating, by the control unit, temperature of air supplied to the intake manifold, to regulate combustion temperature of the hydrogen internal combustion engine.

A third aspect of the disclosure concerns, a hydrogen internal combustion engine unit [also referred to as the 'unit' hereinafter] is disclosed. The unit includes an hydrogen internal combustion engine. The unit further includes a hydrogen supply unit fluidically coupled to the hydrogen internal combustion engine. The unit further includes a fuel supply unit fluidically coupled to the hydrogen internal combustion engine. An intake manifold is fluidically coupled to the hydrogen supply unit, the fuel supply unit, and the hydrogen internal combustion engine. The unit further includes a forced induction unit coupled to the hydrogen internal combustion engine. The forced induction unit is configured to supply air to the hydrogen internal combustion engine. The unit further includes a vortex cooling device fluidically coupled to the forced induction unit. The vortex cooling device is configured to cool compressed air received from the forced induction unit and supply cold air to the intake manifold. The unit further includes a hybrid cooling device thermally interfaced with the vortex cooling device. The hybrid cooling device is configured to operated selectively upon determining temperature of the cold air exceeding the predefined threshold temperature. Operation of the hybrid cooling device is configured to reduce temperature of the cold air below the predefined threshold temperature.

According to a configuration of the third aspect, the hybrid cooling device is thermally interfaced with the vortex cooling device. The hybrid cooling device includes a first cooling device thermally interfaced with the vortex cooling device. The first cooling device includes a phase change material [PCM] enhanced with carbon nanotubes [CNT]. The PCM enhanced with carbon nanotubes is configured to absorb heat generated along a periphery of the vortex cooling device. The hybrid cooling device further includes a second cooling device. The second cooling device includes an ethylene glycol-water cooling module thermally interfaced with the first cooling device. The ethylene glycol-water cooling module is configured to absorb heat from the phase change material enhanced with carbon nanotubes.

According to a configuration of the third aspect, the intake manifold is configured to receive hydrogen from a hydrogen supply unit.

According to a configuration of the third aspect, the forced induction unit is a turbocharger operatively coupled to the exhaust manifold of the hydrogen internal combustion engine. A drive turbine of the turbocharger is configured to be driven by exhaust gases exiting the exhaust manifold.

According to a configuration of the third aspect, the forced induction unit is a supercharger operatively coupled to the hydrogen internal combustion engine. A drive turbine of the supercharger configured to be driven by a crankshaft of the hydrogen internal combustion engine.

EMBODIMENTS

The present disclosure also encompasses embodiments as defined in the following numbered phrases. It should be noted that these numbered embodiments intended to add to this disclosure and is not intended in any way to be limiting.

1. A system for reducing hydrogen knocking in a hydrogen internal combustion engine [H2ICE], wherein the hydrogen internal combustion engine is coupled to an intake manifold, an exhaust manifold, a forced induction unit, and a cooling unit comprising a vortex cooling device and a hybrid cooling device, the system comprising: a control unit communicatively coupled to the intake manifold, the exhaust manifold, the forced induction unit, and the cooling unit, the control unit configured to: route compressed air from the forced induction unit to the vortex cooling device, to cool the compressed air and supply cold air to the intake manifold of the hydrogen internal combustion engine; and compare temperature of the cold air discharged by the vortex cooling device against a predefined threshold temperature, wherein temperature of the cold air exceeding the predefined threshold temperature causes hydrogen knocking in the hydrogen internal combustion engine; and selectively operate a hybrid cooling device thermally interfaced with the vortex cooling device, upon determining temperature of the cold air exceeding the predefined threshold temperature, wherein operation of the hybrid cooling device is configured to reduce temperature of the cold air below the predefined threshold temperature.

2. The system of embodiment 1, wherein the hybrid cooling device is thermally interfaced with the vortex cooling device, the hybrid cooling device comprising: a first cooling device thermally interfaced with the vortex cooling device, the first cooling device including a phase change material [PCM] enhanced with carbon nanotubes [CNT], and wherein the phase change material enhanced with carbon nanotubes is configured to absorb heat generated along a periphery of the vortex cooling device; and a second cooling device, the second cooling device including an ethylene glycol-water cooling module thermally interfaced with the first cooling device, the ethylene glycol-water cooling module configured to absorb heat from the phase change material enhanced with carbon nanotubes.

3. The system of embodiment 1, wherein the intake manifold is configured to receive hydrogen from a hydrogen supply unit.

4. The system of embodiment 1, wherein the forced induction unit is a turbocharger operatively coupled to the exhaust manifold of the hydrogen internal combustion engine, and wherein a drive turbine of the turbocharger configured to be driven by exhaust gases exiting the exhaust manifold.

5. The system of embodiment 1, wherein the forced induction unit is a supercharger operatively coupled to the hydrogen internal combustion engine, and wherein a drive turbine of the supercharger configured to be driven by a crankshaft of the hydrogen internal combustion engine.

6. The system of embodiment 1, wherein the hydrogen internal combustion engine is a hydrogen-gasoline dual-fuel engine, and wherein the hydrogen internal combustion engine is a spark-ignition engine.

7. A method for reducing hydrogen knocking in a hydrogen internal combustion engine [H2ICE], wherein the hydrogen internal combustion engine is coupled to an intake manifold, an exhaust manifold, a forced induction unit, and a cooling unit comprising a vortex cooling device and a hybrid cooling device, wherein the method comprising: routing, by a control unit, compressed air from the forced induction unit to the vortex cooling device, to cool the compressed air and supply cold air to the intake manifold of the hydrogen internal combustion engine; and comparing, by the control unit, temperature of the cold air discharged by the vortex cooling device against a predefined threshold temperature, wherein exceeding the predefined threshold temperature causes hydrogen knocking in the hydrogen internal combustion engine; and selectively operating, by the control unit, a hybrid cooling device thermally interfaced with the vortex cooling device, upon determining temperature of the cold air exceeding the predefined threshold temperature, wherein operation of the hybrid cooling device is configured to reduce temperature of the cold air below the predefined threshold temperature.

8. The method of embodiment 7, wherein selectively operating the hybrid cooling device includes: operating, a first cooling device thermally interfaced with the vortex cooling device, the first cooling device including a phase change material [PCM] enhanced with carbon nanotubes [CNT], and wherein the PCM configured to absorb heat generated along a periphery of the vortex cooling device; and operating, a second cooling device, wherein the second cooling device includes an ethylene glycol-water cooling module thermally interfaced with the first cooling device, the ethylene glycol-water cooling module configured to absorb heat from the phase change material enhanced with carbon nanotubes.

9. The method of embodiment 7, comprises supplying hydrogen to the intake manifold from a hydrogen supply unit.

10. The method of embodiment 7, comprises regulating, by the control unit, temperature of air supplied to the intake manifold, to regulate combustion temperature of the hydrogen internal combustion engine.

11. A hydrogen internal combustion engine unit, comprising: an hydrogen internal combustion engine; a hydrogen supply unit fluidically coupled to the hydrogen internal combustion engine; a fuel supply unit fluidically coupled to the hydrogen internal combustion engine; an intake manifold fluidically coupled to the hydrogen supply unit, the fuel supply unit, and the hydrogen internal combustion engine; a forced induction unit coupled to the hydrogen internal combustion engine, the forced induction unit configured to supply air to the hydrogen internal combustion engine; a vortex cooling device fluidically coupled to the forced induction unit, the vortex cooling device configured to cool compressed air received from the forced induction unit, and supply cold air to the intake manifold; and a hybrid cooling device thermally interfaced with the vortex cooling device, the hybrid cooling device configured to operated selectively upon determining temperature of the cold air exceeding the predefined threshold temperature, wherein operation of the hybrid cooling device is configured to reduce temperature of the cold air below the predefined threshold temperature.

12. The hydrogen internal combustion engine unit of embodiment 11, wherein the hybrid cooling device is thermally interfaced with the vortex cooling device, the hybrid cooling device comprising: a first cooling device thermally interfaced with the vortex cooling device, the first cooling device including a phase change material [PCM] enhanced with carbon nanotubes [CNT], and wherein the PCM enhanced with carbon nanotubes is configured to absorb heat generated along a periphery of the vortex cooling device; and a second cooling device, the second cooling device including an ethylene glycol-water cooling module thermally interfaced with the first cooling device, the ethylene glycol-water cooling module configured to absorb heat from the phase change material enhanced with carbon nanotubes.

13. The hydrogen internal combustion engine unit of embodiment 11, wherein the intake manifold is configured to receive hydrogen from a hydrogen supply unit.

14. The hydrogen internal combustion engine unit of embodiment 11, wherein the forced induction unit is a turbocharger operatively coupled to the exhaust manifold of the hydrogen internal combustion engine, and wherein a drive turbine of the turbocharger configured to be driven by exhaust gases exiting the exhaust manifold.

15. The hydrogen internal combustion engine unit of embodiment 11, wherein the forced induction unit is a supercharger operatively coupled to the hydrogen internal combustion engine, and wherein a drive turbine of the supercharger configured to be driven by a crankshaft of the hydrogen internal combustion engine.

BRIEF DESCRIPTION OF DRAWINGS

In order to better understand the subject matter that is disclosed herein and to exemplify how it may be carried out in practice, embodiments will now be described, by way of non-limiting examples only, with reference to the accompanying drawings, in which.

[H2ICE], in accordance with another exemplary embodiment of the present disclosure.

Figure 1:
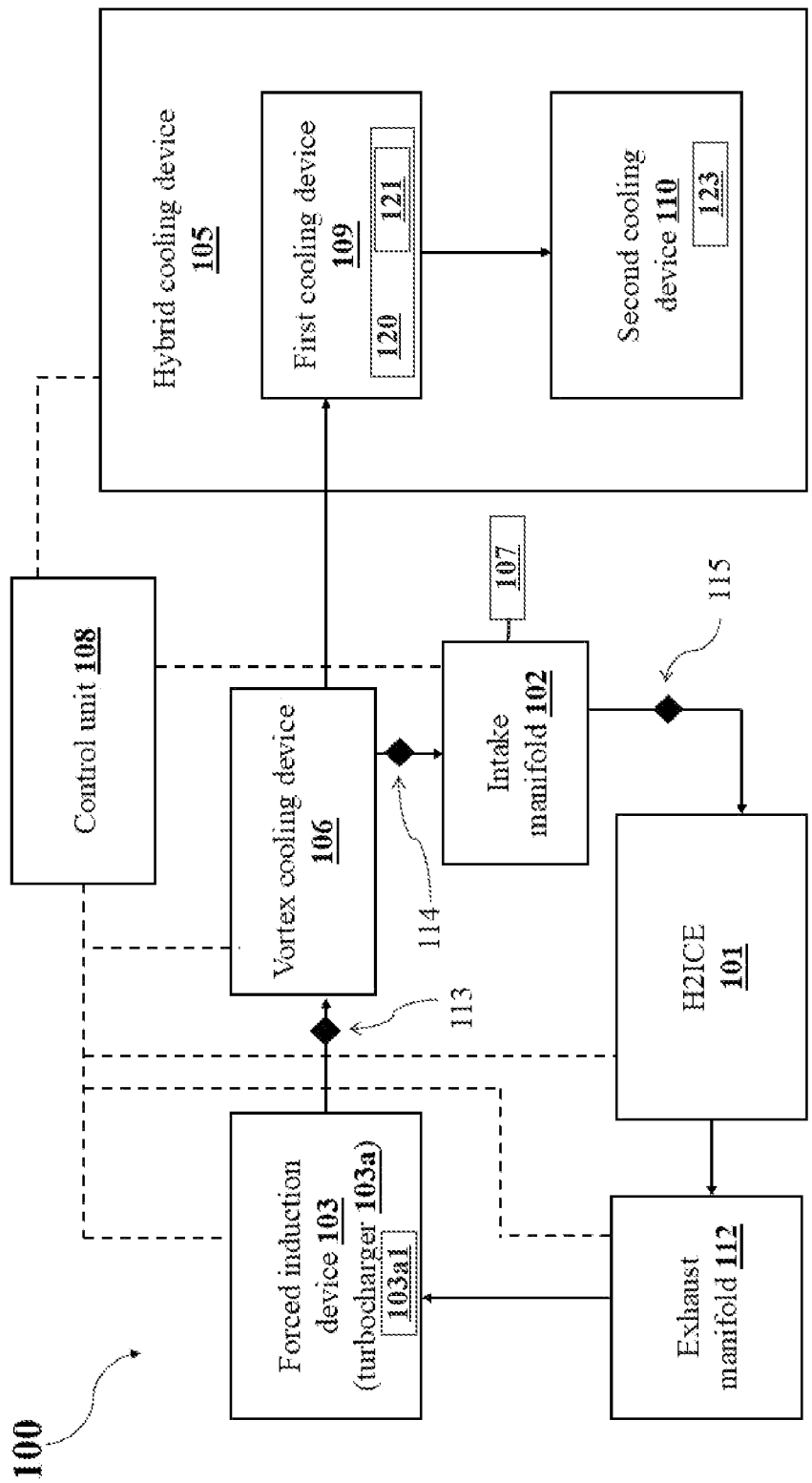
FIG. 1 illustrates a system for reducing hydrogen knocking in a hydrogen internal combustion engine [H2ICE], in accordance with an exemplary embodiment of the present disclosure.
Figure 2:
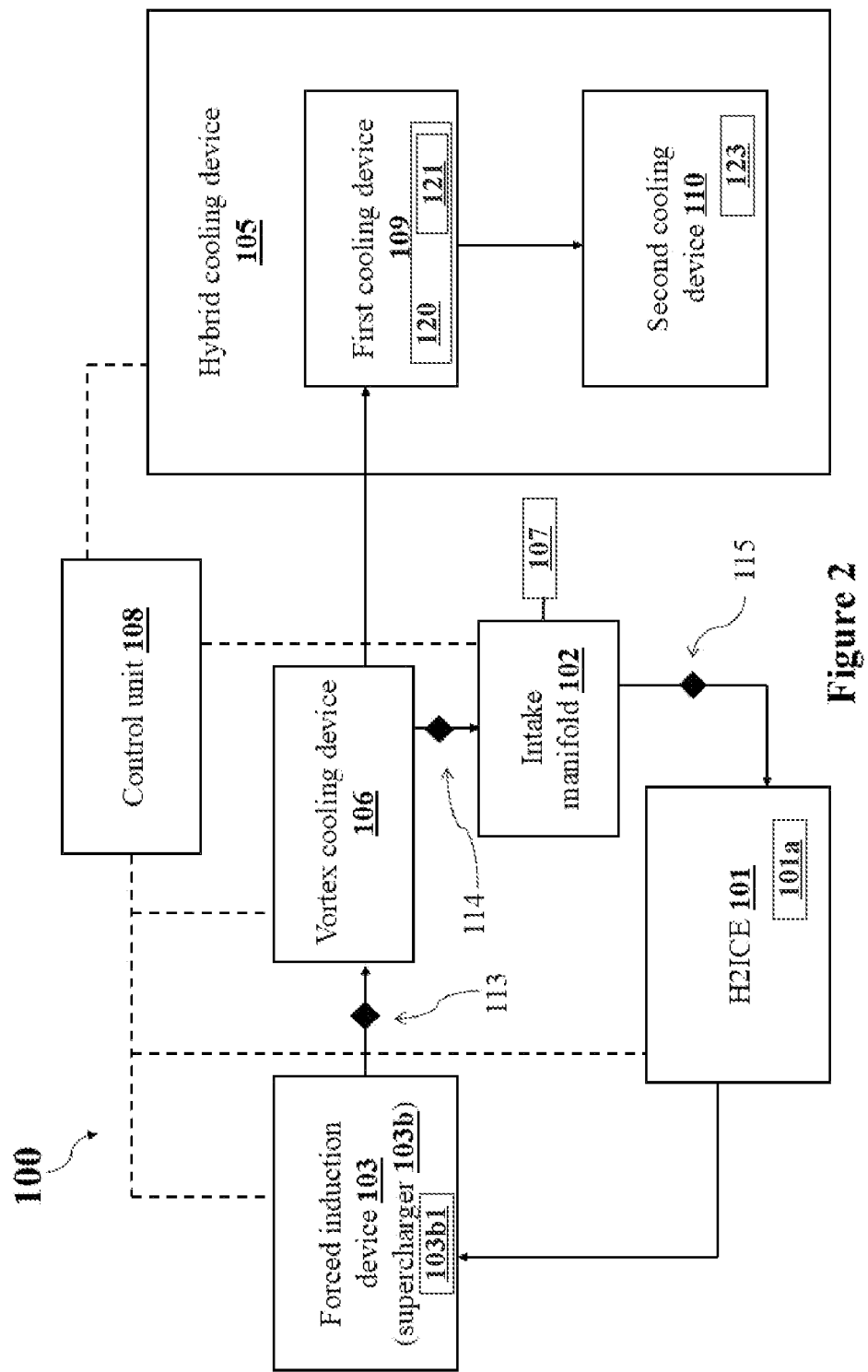
FIG. 2 illustrates the system for reducing hydrogen knocking in a hydrogen internal combustion engine
Figure 3:
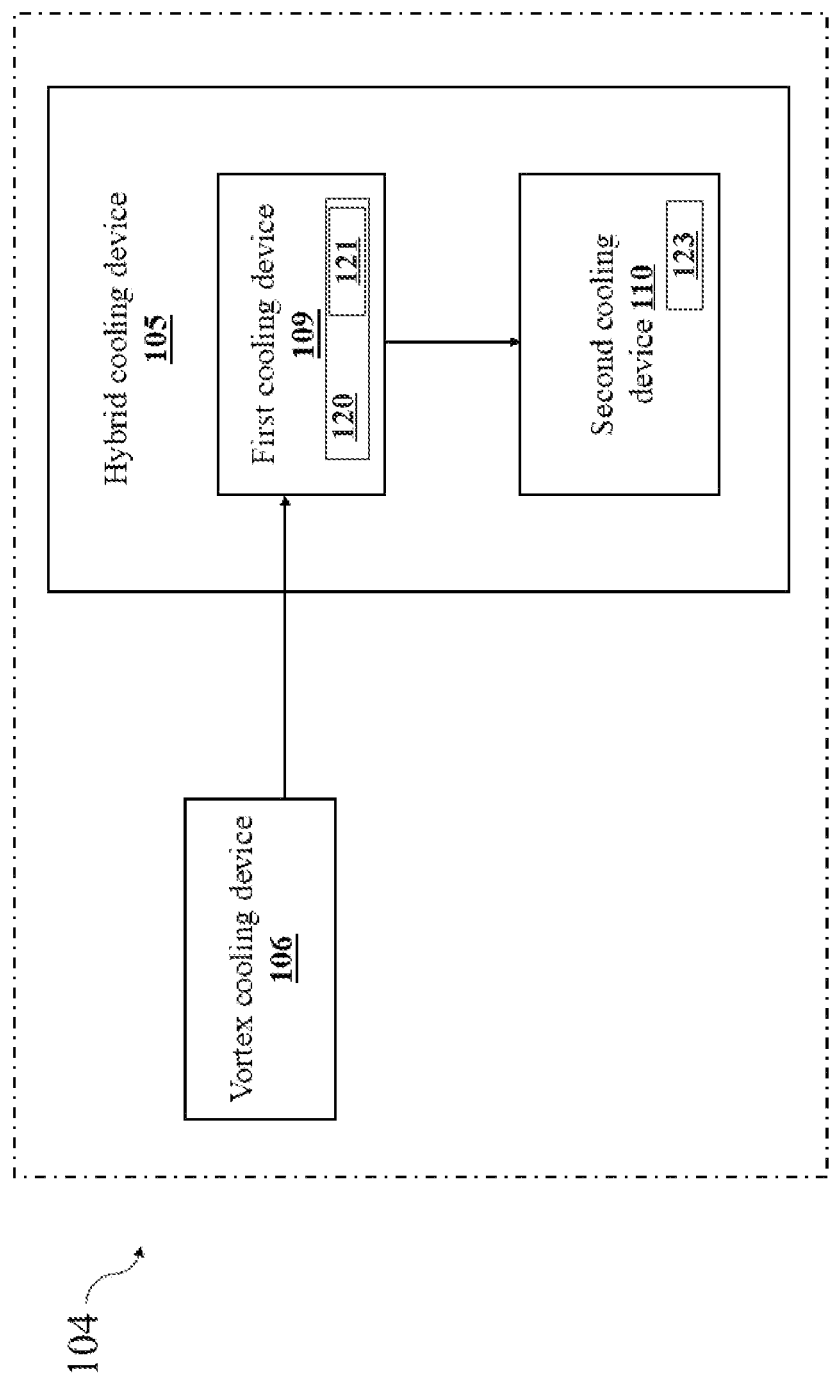

FIG. 3 illustrates a cooling unit included in the system of the FIGS. 1 and 2, in accordance with an exemplary embodiment of the present disclosure.

Figure 4:
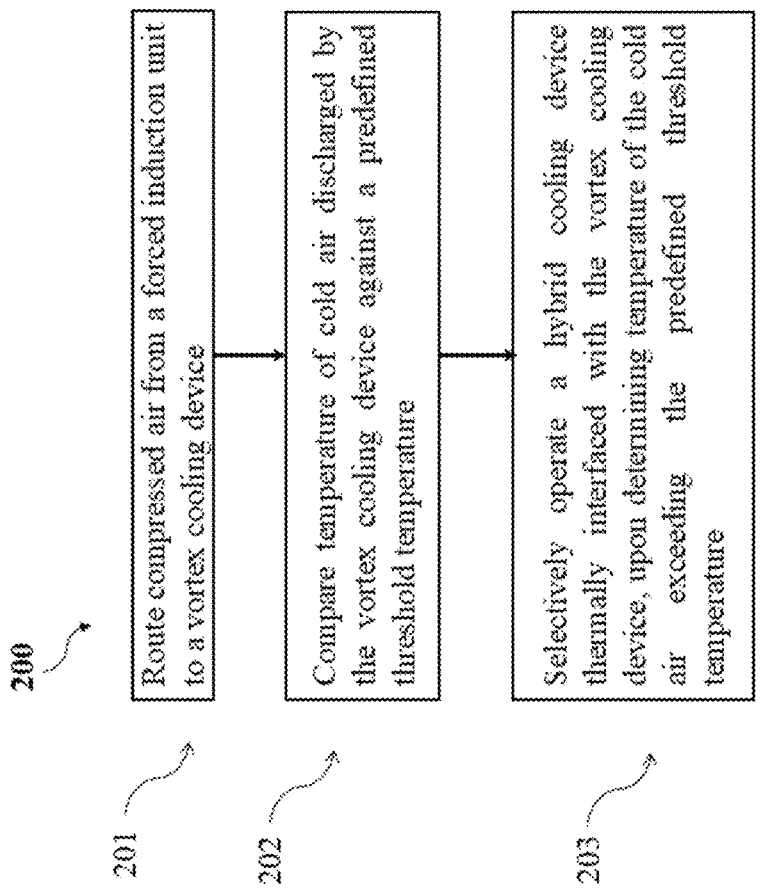

FIG. 4 illustrates a method for reducing hydrogen knocking in a hydrogen internal combustion engine [H2ICE], in accordance with an embodiment of the present disclosure.

Figure 5:
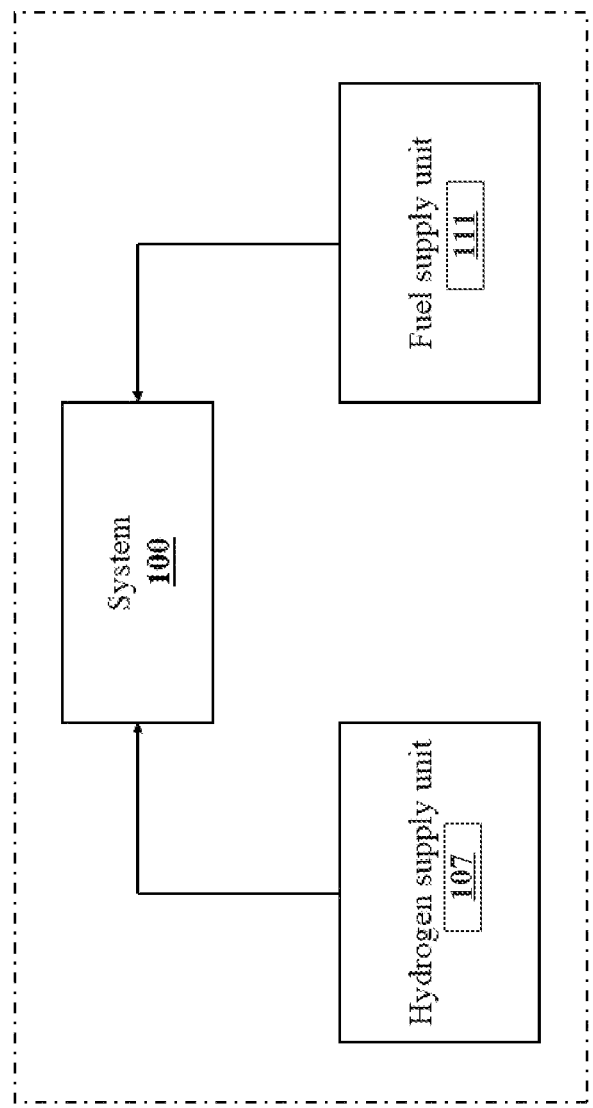

FIG. 5 illustrates a hydrogen internal combustion engine unit, in accordance with an embodiment of the present disclosure.

Figure 6:
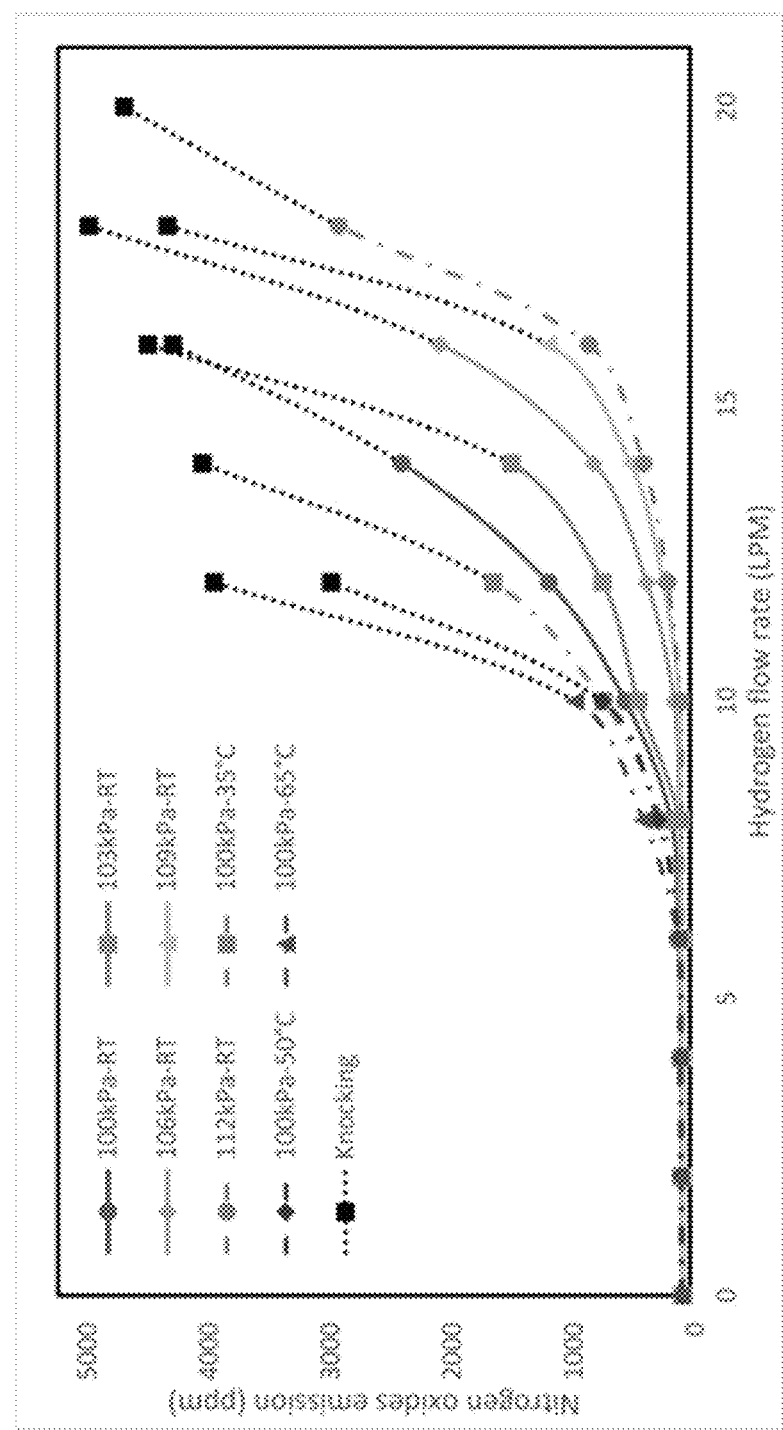
Figure 7:
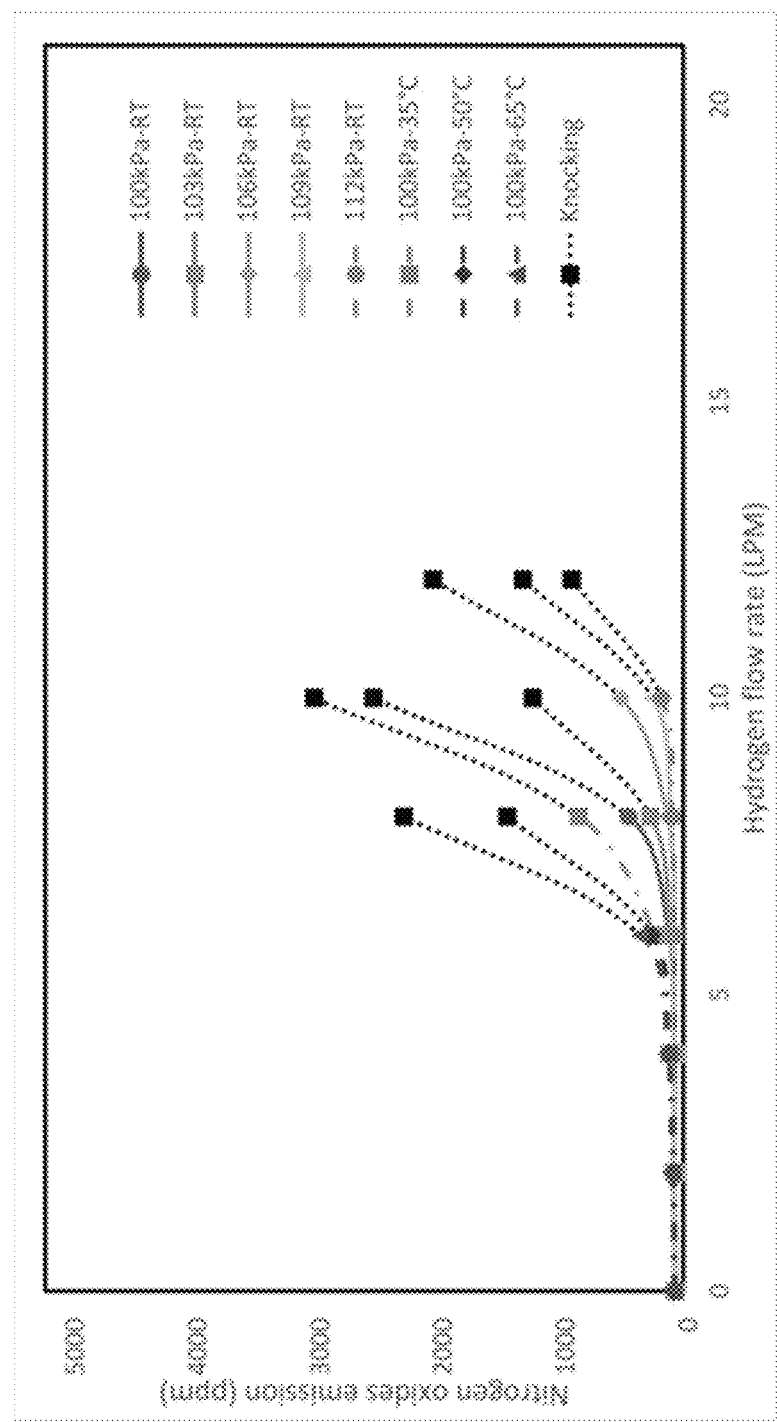

FIGS. 6 and 7 illustrate $NO_X$ emission variation at various intake air pressure and temperatures versus hydrogen flow rate at 4° C. A and 12° CA before TDC, respectively.

Figure 8:
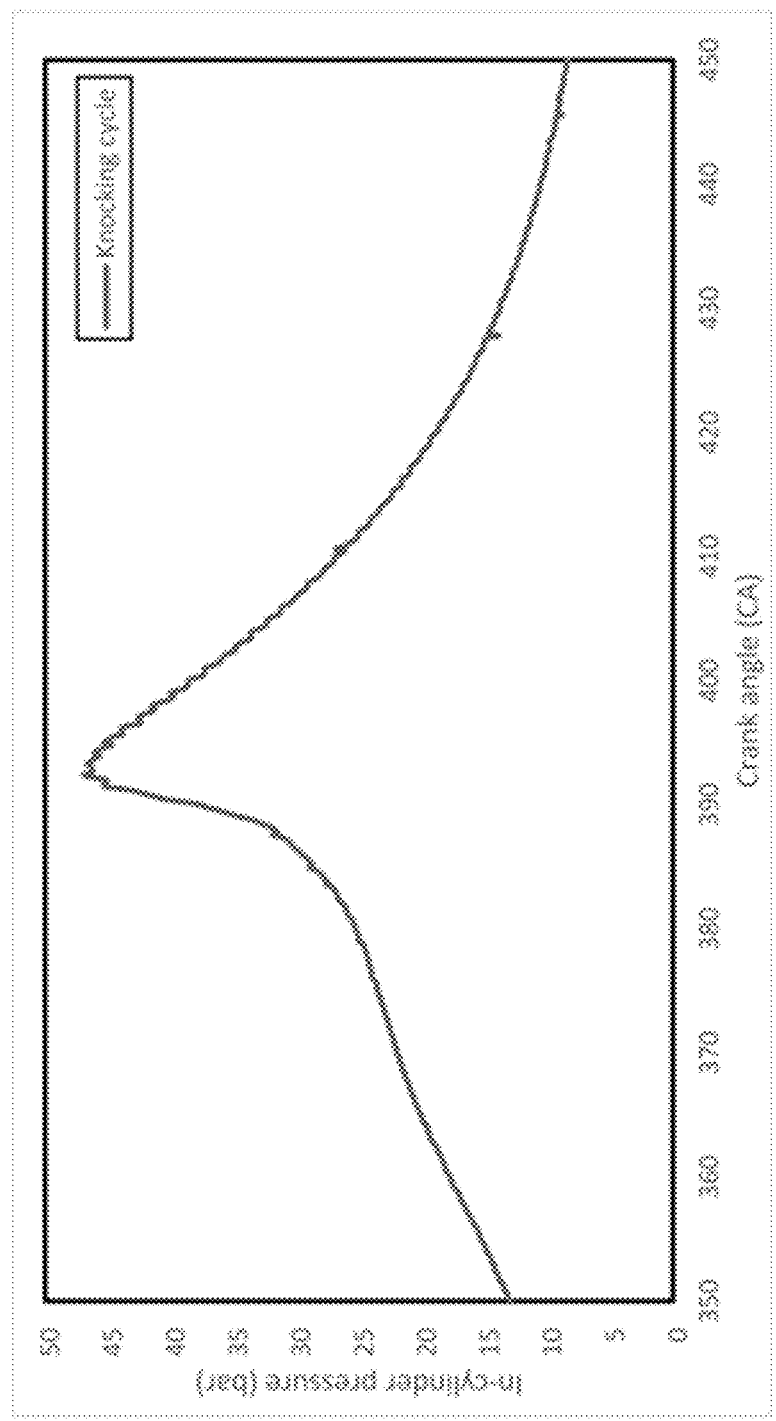

FIG. 8 is a graph of combustion knock identification from pressure-crank angle diagram.

Figure 9:
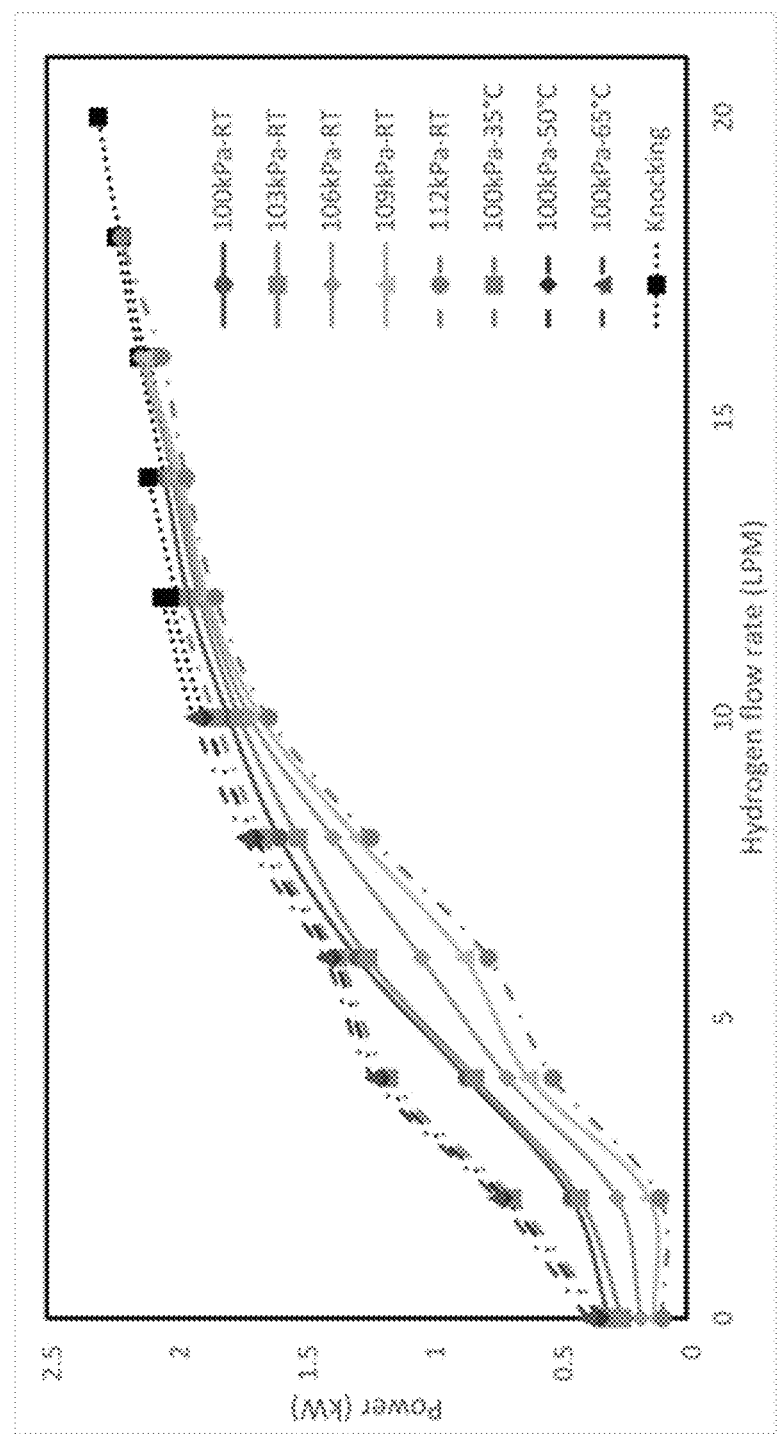
Figure 10:
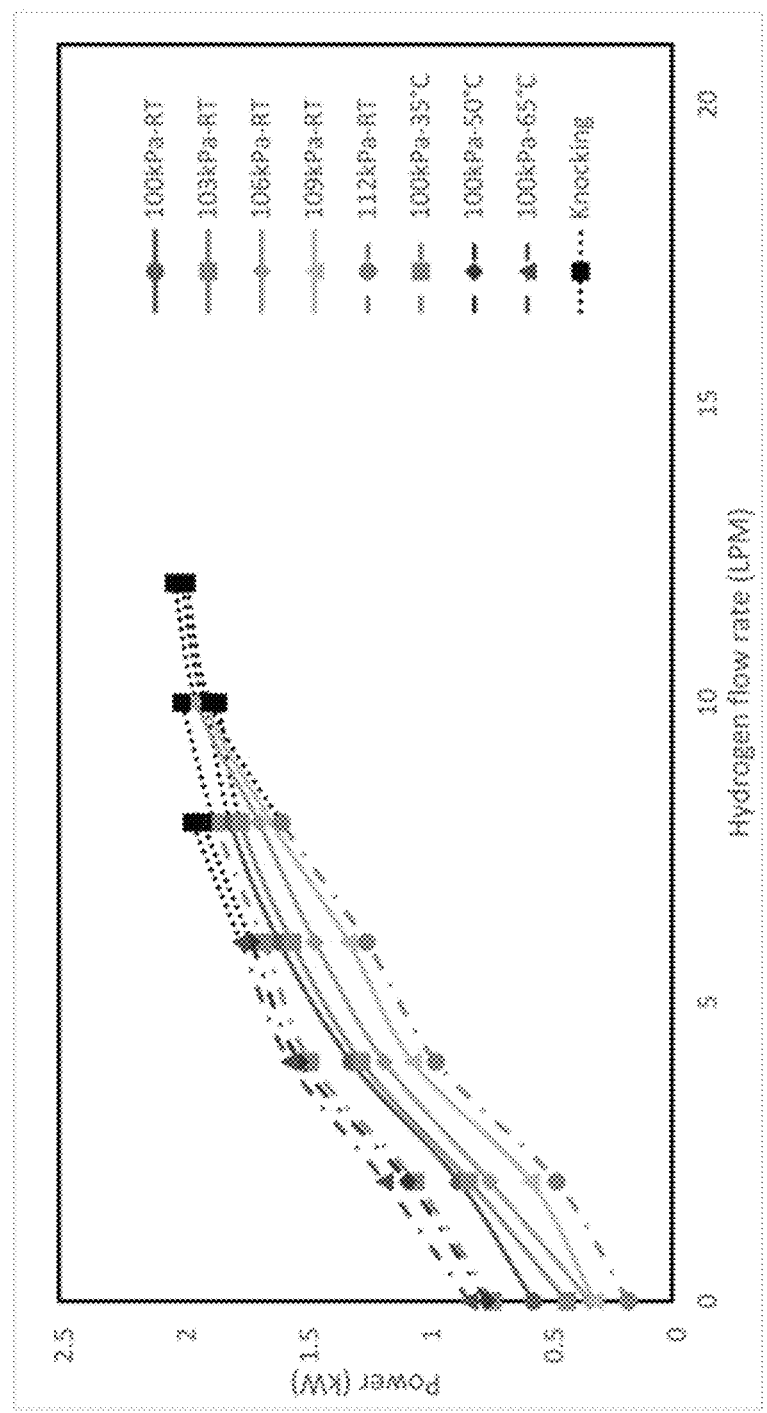

FIGS. 9 and 10 illustrate hydrogen knock limit variation at various intake air pressure and temperatures versus hydrogen flow rate at 4° C. A and 12° CA before TDC, respectively.

DETAILED DESCRIPTION OF EMBODIMENTS

FIG. 1 illustrates a system (100) for reducing hydrogen knocking in a hydrogen internal combustion engine [H2ICE] (101), [also referred to as the 'system (100)' hereinafter], in accordance with an exemplary embodiment of the present disclosure. The hydrogen internal combustion engine (101) is a hydrogen-gasoline dual-fuel engine. In an implementation, the hydrogen internal combustion engine (101) may be a spark-ignition engine. The hydrogen internal combustion engine (101) is coupled to an intake manifold (102), an exhaust manifold (112), a forced induction unit (103), and a cooling unit (104). The forced induction unit (103) may be a turbocharger (103a).

FIG. 2 illustrates the system (100) for reducing hydrogen knocking in a hydrogen internal combustion engine [H2ICE] (101) [also referred to as the 'system (100)' hereinafter], in accordance with another exemplary embodiment of the present disclosure. Similar to the system (100) of the FIG. 1, the hydrogen internal combustion engine (101) is the hydrogen-gasoline dual-fuel engine. The hydrogen internal combustion engine (101) may be a spark-ignition engine. The hydrogen internal combustion engine (101) is coupled to the intake manifold (102), the exhaust manifold (112), the forced induction unit (103), and the cooling unit (104). The forced induction unit (103) is a supercharger (103b).

The FIG. 1 illustrates such embodiment of the system (100) where the forced induction unit (103) is implemented as a turbocharger (103a). In the embodiment of the FIG. 1, the turbocharger (103a) is operatively coupled to the exhaust manifold (112) of the hydrogen internal combustion engine (101). A drive turbine 103a1 of the turbocharger (103a) is configured to be driven by exhaust gases exiting the exhaust manifold (112). Further, the FIG. 2 illustrates the embodiment of the system (100) where the forced induction unit (103) is implemented as a supercharger (103b). The supercharger (103b) is operatively coupled to the hydrogen internal combustion engine (101). A drive turbine 103b1 of the supercharger (103b) is configured to be driven by a crankshaft 101a of the hydrogen internal combustion engine (101). Except for the differences in the type of forced induction unit (103), rest features, aspects and configuration of the system (100) of the FIGS. 1 and 2 remain same.

Further, in an implementation, the intake manifold (102) and the exhaust manifold (112) may be formed as an integral part of the hydrogen internal combustion engine (101). However, in another implementation, the intake manifold (102) and the exhaust manifold (112) may be separate units that are fluidically coupled to the hydrogen internal combustion engine (101). The intake manifold (102) is configured to receive hydrogen from a hydrogen supply unit (107). Further, the exhaust manifold (112) is configured to receive exhaust gases exiting the combustion of the hydrogen internal combustion engine (101).

Referring to FIGS. 1 and 2, the system (100) includes a control unit (108). The control unit (108) is communicatively coupled to the intake manifold (102), the exhaust manifold (112), the forced induction unit (103), and the cooling unit (104). The control unit (108) is configured to route compressed air [compressed in the forced induction unit (103)] from the forced induction unit (103) to the vortex cooling device (106). In an implementation, the system (100) may include a first flow control valve (113) disposed between the forced induction unit (103) and the vortex cooling device (106). The control unit (108) is configured to regulate operation of the first flow control valve (113), to regulate flow rate of the compressed air from the forced induction unit (103) to the vortex cooling device (106). The vortex cooling device (106) is configured to cool the compressed air and supply cold air to the intake manifold (102) of the hydrogen internal combustion engine (101). In an implementation, the system (100) may include a second flow control valve (114) disposed between the vortex cooling device (106) and the intake manifold (102). The control unit (108) is configured to regulate operation of the second flow control valve (114), to regulate flow rate of cold air to the intake manifold (102) from the vortex cooling device (106). The system (100) further includes a third flow control valve (115) disposed between the intake manifold (102) and a combustion chamber [not shown in the Figures] of the hydrogen internal combustion engine (101). The control unit (108) is configured to regulate operation of the third flow control valve (115), to regulate flow rate of cold air to the combustion chamber. The flow control valves (113, 114 and 115) are communicatively coupled with the control unit (108), to receive signals from the control unit (108). In an implementation, the signal received by the flow control valves (113, 114 and 115) is at least one of an electrical signal and an electronic signal. By regulating operation of the corresponding flow rate by the flow control valves (113, 114, and 115), the amount of air flowing between the components of the hydrogen internal combustion engine (101) is regulated. In an implementation, by regulating operation of the flow control valves (113, 114, and 115), flow rate of air is regulated, so as to achieve a required temperature of 'charge' [mixture of air, fuel, and hydrogen].

FIG. 3 illustrates the cooling unit (104) in accordance with an exemplary embodiment of the present disclosure. The cooling unit (104) includes a vortex cooling device (106) and a hybrid cooling device (105). The vortex cooling device (106) is configured to receive compressed air from the forced induction device and induce vortex into the received air, so as to cool down the air. In an implementation, the vortex cooling device (106) includes an inlet port for receiving compressed air from the forced induction unit (103). The received air is spun inside the vortex cooling device (106) to produce a cold air stream and a hot air stream. The hot air stream is further cooled down in the system (100) as will be explained in the following paragraphs. The vortex cooling device (106) further includes one or more outlet ports for discharging the cold air (including cold air stream and the cooled down hot air stream), towards the intake manifold (102) of the hydrogen internal combustion engine (101).

In an implementation of the vortex cooling device (106), compressed air from the forced induction unit (103) is injected tangentially into a vortex tube [not shown in the Figures] of the vortex cooling device (106). The injected compressed air spins rapidly, forming a vortex. The spinning air heats up as it moves along inner walls of the vortex tube. A portion of the hot air moves towards peripheral walls of the vortex tube. Remaining portion of injected air is forced to counterflow through a center of the high-speed air stream. Such slower-moving [slower in comparison with hot air moving towards periphery of the vortex tube] air loses energy in the form of heat, becoming cooled. The cooled air exits the vortex tube through an outlet port. The portion of the hot air that has moved towards the peripheral walls of the vortex tube is cooled down by the hybrid cooling device (105) as will be described in the following paragraphs.

The control unit (108) is further configured to compare temperature of the cold air discharged [discharged towards intake manifold (102)] by the vortex cooling device (106), against a predefined threshold temperature. The temperature of the cold air exceeding the predefined threshold temperature causes hydrogen knocking in the hydrogen internal combustion engine (101). Upon determining that the temperature of the cold air exceeds the predefined threshold temperature, the control unit (108) is further configured to operate the hybrid cooling device (105). The hybrid cooling device (105) is thermally interfaced with the vortex cooling device (106). Operation of the hybrid cooling device (105) is configured to reduce temperature of the cold air below the predefined threshold temperature, and thereby the hydrogen knocking in the hydrogen internal combustion engine (101).

Referring to FIG. 3, the hybrid cooling device (105) is thermally interfaced with the vortex cooling device (106). The term 'thermally interfaced' as used herein refers to the aspect of the hybrid cooling device (105) and the vortex cooling device (106), being configured to transfer heat therebetween. The hybrid cooling device (105) is thermally interfaced with the vortex cooling device (106), so as to absorb heat from the air about peripheral walls of the vortex tube of the vortex cooling device (106). Peripheral wall of the vortex tube gets heated up by the hot air stream formed within the vortex tube. Such hot stream requires cooling before being supplied to the intake manifold (102). Such cooling of the hot air stream is performed by absorbing heat from peripheral walls of the vortex tube by the hybrid cooling device (105), and in turn cool down the hot air stream at the periphery of the vortex tube.

In an implementation, thermal interface between the hybrid cooling device (105) and the vortex cooling device (106) is formed by having an area/region facilitating heat transfer therebetween. For thermal interfacing, a concentric stainless steel casing filled with PCM (102) infused with CNT (121) is placed around the main tube of the vortex tube. A secondary cooling loop, carrying an ethylene glycol-water mixture, flows through a cooling channel surrounding the metallic casing.

To facilitate heat transfer from the vortex cooling device (106) to the hybrid cooling device (105), the hybrid cooling device (105) includes a first cooling device (109) which is thermally interfaced with the vortex cooling device (106). The first cooling device (109) includes a phase change material [PCM] (120) enhanced with carbon nanotubes [CNT] (121). The preferred PCM (120) material is indium, which has a melting point of 157° C. and a thermal conductivity of 82 W/m·K. To enhance its thermal conductivity, carbon nanotubes (CNTs) (121) are infused into the PCM (120). Additionally, gallium (melting point: 30° C., thermal conductivity: 40 W/m·K) and tin (melting point: 232° C., thermal conductivity: 66 W/m·K) can also be used as PCM materials, either individually or in combination, for the same purpose.

The carbon nanotubes (121) increase thermal conductivity of the PCM (120). The phase change material enhanced with carbon nanotubes (121), is configured to absorb heat generated along peripheral walls of the vortex cooling device (106). In an implementation, the carbon nanotubes (121) may be lined along peripheral walls of the vortex tube of the vortex cooling device (106). In an implementation, the first cooling device (109) may be formed concentrically around at least a portion of the vortex cooling device (106), like a cooling jacket formed therearound. To increase magnitude of heat absorption and to prevent saturation of heat transfer upon complete melting [phase change] of the PCM (120), the hybrid cooling device (105) further includes a second cooling device (110). The second cooling device (110) is configured to overcome drawback of low thermal conductivity associated with the PCM (120) [in its melted or phase-changed state]. The second cooling device (110) includes an ethylene glycol-water cooling module (123) thermally interfaced with the first cooling device (109). The ethylene glycol-water cooling module (123) is configured to absorb heat from the phase change material enhanced with carbon nanotubes (121).

Such configuration of the cooling unit (104) including the hybrid cooling device (105) and the vortex cooling device (106), enhances magnitude of the heat absorption from the hot air stream generated in the vortex of the vortex cooling device (106). The system (100) including the cooling unit (104) of the present disclosure, by facilitating cooling down of hot air stream in the vortex tube, further facilitates supply of cooled air to the intake manifold (102) of the hydrogen internal combustion engine (101). Such configuration of the cooling unit (104) including the hybrid cooling device (105) and the vortex cooling device (106), helps in regulating temperature of cold air suppled to the intake manifold (102), so as to reduce temperature of the cold air below the predefined threshold temperature, and thereby the hydrogen knocking in the hydrogen internal combustion engine (101). Further, by regulating operation of the flow control valves (113, 114, and 115), flow rate of air is regulated into the combustion chamber, so as to achieve a required temperature of 'charge' [mixture of air, fuel, and hydrogen], to prevent hydrogen knocking in the hydrogen internal combustion engine (101).

FIG. 4 illustrates a method (200) for reducing hydrogen knocking in a hydrogen internal combustion engine [H2ICE] (101) [also referred to as the 'method' hereinafter], in accordance with an embodiment of the present disclosure. The hydrogen internal combustion engine (101) is coupled to an intake manifold (102), an exhaust manifold (112), a forced induction unit (103), and a cooling unit (104). The cooling unit (104) includes a vortex cooling device (106) and a hybrid cooling device (105). The method (200) includes steps 201 to 203, which is described in following paragraphs. Features and operational aspects of the hydrogen internal combustion engine [H2ICE] (101) referred to in the method (200) is similar to and remains substantially same as that of the hydrogen internal combustion engine [H2ICE] (101) of the system (100) depicted in the FIGS. 1 to 3.

At step 201, the method (200) includes routing, by a control unit (108), compressed air from the forced induction unit (103) to the vortex cooling device (106). The compressed air is cooled down in the vortex cooling device (106) and the cold air is supplied to the intake manifold (102) of the hydrogen internal combustion engine (101). The method (200) also includes supplying hydrogen to the intake manifold (102) from a hydrogen supply unit (107). Regulating flow of compressed air and subsequently the cold air includes regulating operation of the flow control valves (113, 114 and 115) by the control unit (108) as described in above paragraphs. The flow control valves (113, 114 and 115) are communicatively coupled with the control unit (108), to receive signals from the control unit (108). By regulating operation of the corresponding flow rate by the flow control valves (113, 114, and 115), the amount of air flowing between the components of the hydrogen internal combustion engine (101) is regulated, and thereby maintaining temperature of intake air and temperature of 'charge' [mixture of air, fuel, and hydrogen] within required ranges of temperature.

At step 202, the method (200) further includes comparing, by the control unit (108), temperature of the cold air discharged by the vortex cooling device (106) against a predefined threshold temperature. The temperature of the cold air exceeding the predefined threshold temperature causes hydrogen knocking in the hydrogen internal combustion engine (101).

At step 203, the method (200) further includes selectively operating, by the control unit (108), a hybrid cooling device (105). The hybrid cooling device (105) is thermally interfaced with the vortex cooling device (106). The hybrid cooling device (105) is operated upon determining temperature of the cold air exceeding the predefined threshold temperature. Operation of the hybrid cooling device (105) is configured to reduce temperature of the cold air below the predefined threshold temperature. In an implementation, selectively operating the hybrid cooling device (105) includes operating, a first cooling device (109) thermally interfaced with the vortex cooling device (106).

The first cooling device (109) includes a phase change material [PCM] (120) enhanced with carbon nanotubes [CNT] (121). The PCM (120) is configured to absorb heat generated along peripheral walls of the vortex cooling device (106). In the embodiment, selectively operating the hybrid cooling device (105) further includes operating a second cooling device (110). The second cooling device (110) includes an ethylene glycol-water cooling module (123) thermally interfaced with the first cooling device (109). The ethylene glycol-water cooling module (123) is configured to absorb heat from the phase change material (120) enhanced with carbon nanotubes (121). In such manner, the method (200) involves regulating temperature of air supplied to the intake manifold (102), to regulate combustion temperature of the hydrogen internal combustion engine (101).

FIG. 5 illustrates a hydrogen internal combustion engine unit (300) [also referred to as the 'unit' hereinafter], in accordance with an embodiment of the present disclosure. The unit (300) includes an hydrogen internal combustion engine (101). Features and operational aspects of the hydrogen internal combustion engine [H2ICE] (101) referred to in the unit (300) is similar to and remains substantially same as that of the hydrogen internal combustion engine [H2ICE] (101) of the system (100) depicted in the FIGS. 1 to 3.

The unit (300) further includes a hydrogen supply unit (107) fluidically coupled to the hydrogen internal combustion engine (101). An intake manifold (102) is fluidically coupled to the hydrogen supply unit (107). The intake manifold (102) is configured to receive hydrogen from a hydrogen supply unit (107). The unit (300) further includes a fuel supply unit (111) fluidically coupled to the hydrogen internal combustion engine (101). The intake manifold (102) is fluidically coupled to the fuel supply unit (111), and the hydrogen internal combustion engine (101). In an implementation, the intake manifold (102) may be formed as an integral part of the hydrogen internal combustion engine (101). However, in another implementation, the intake manifold (102) may be a separate unit that is fluidically coupled to the hydrogen internal combustion engine (101).

The unit (300) further includes a forced induction unit (103) coupled to the hydrogen internal combustion engine (101). The forced induction unit (103) is configured to supply air to the hydrogen internal combustion engine (101). In one implementation, the forced induction unit (103) may be a turbocharger (103*a*) operatively coupled to the exhaust manifold (112) of the hydrogen internal combustion engine (101). A drive turbine 103*a*1 of the turbocharger (103*a*) is configured to be driven by exhaust gases exiting the exhaust manifold (112). In another implementation, the forced induction unit (103) may be a supercharger (103*b*) operatively coupled to the hydrogen internal combustion engine (101). A drive turbine 103*b*1 of the supercharger (103*b*) configured to be driven by a crankshaft 101*a* of the hydrogen internal combustion engine (101).

Continuing our reference to FIG. 4, the unit (300) further includes a vortex cooling device (106) fluidically coupled to the forced induction unit (103). The vortex cooling device (106) is configured to cool compressed air received from the forced induction unit (103), and supply cold air to the intake manifold (102). In an implementation of the vortex cooling device (106), compressed air from the forced induction unit (103) is injected tangentially into a vortex tube [not shown in the Figures] of the vortex cooling device (106). The injected compressed air spins rapidly, forming a vortex. The spinning air heats up as it moves along inner walls of the vortex tube. A portion of the hot air moves towards peripheral walls of the vortex tube. A remaining portion of injected air is forced to counterflow through a center of the high-speed air stream. Such slower-moving air loses energy in the form of heat, becoming cooled. The cooled air exits the vortex tube through an outlet port. The portion of the hot air that has moved towards the peripheral walls of the vortex tube is cooled down by the hybrid cooling device (105).

The unit (300) further includes a hybrid cooling device (105) thermally interfaced with the vortex cooling device (106). The hybrid cooling device (105) is configured to operated selectively upon determining temperature of the cold air exceeding the predefined threshold temperature. The hybrid cooling device (105) includes a first cooling device (109) thermally interfaced with the vortex cooling device (106). The first cooling device (109) includes a phase change material [PCM] (120) enhanced with carbon nanotubes [CNT] (121). The PCM (120) enhanced with carbon nanotubes (121) is configured to absorb heat generated along peripheral walls of the vortex cooling device (106). The hybrid cooling device (105) further includes a second cooling device (110). The second cooling device (110) includes an ethylene glycol-water cooling module (123) thermally interfaced with the first cooling device (109). The ethylene glycol-water cooling module (123) is configured to absorb heat from the phase change material (120) enhanced with carbon nanotubes (121). In such manner, operation of the hybrid cooling device (105) is configured to reduce temperature of the cold air below the predefined threshold temperature.

Experimental Studies

Experiments in accordance with the system (100), the method (200) and the unit (300) were conducted on a Ricardo single-cylinder gasoline direct injection spark ignition engine. Specifications of the set-up are detailed in Table 1 below.

TABLE 1

Engine specification.

| Parameter | Description |
|---|---|
| Displacement | 0.5 L |
| Engine type | Air cooled single cylinder |
| Bore | 86 mm |
| Stroke | 86 mm |
| Peak power (Naturally aspirated) | 3.8 kW@2000 rpm |
| Peak torque (Naturally aspirated) | 23.5 Nm@ 1500 rpm |
| Ignition timing | Variable (12'CA before top dead centre) |
| Compression ratio | 11.5:1 |

For combustion analysis, a Kistler 6125 pressure transducer and a Leine Linde ruggedized crank angle shaft encoder were employed. Data was recorded via a high-speed data acquisition system (NI USB 6210). The experimental setup was modified to introduce hydrogen gas into the intake manifold, enabling operation in dual-fuel mode. The setup is a motoring engine coupled to a Vascat MAC QI 132 dynamometer, which can deliver a maximum power output of 34.4 kW and a torque of 100 Nm. An S-type load cell (Interface, USA) was connected to the dynamometer to monitor the engine's load.

To monitor the incoming air, a Sierra Fastflo 620S mass air flowmeter was employed. Hydrogen gas was supplied at 1.5 bar from a pressurized cylinder through a pressure regulator, and the hydrogen flow rate was measured using an LTZ-08 M panel rotameter. To control the intake temperature and pressure, a specialized combustion air handling unit (Sierra boost rig model) was employed. The air handling unit is equipped with a 15 kW screw-type air compressor and an air heater. Additionally, a wet-type flame trap and a hydrogen flashback arrestor (Bosewell) were installed in the hydrogen supply line to prevent flames from reaching the hydrogen source in the event of a backfire.

To ensure repeatable results, the engine oil and coolant were maintained at 90° C. using automated control valves. The engine speed, throttle opening, intake temperature, and pressure were managed through CADET software, developed by Sierra CP Engineering. An electronic control unit (Pectel SQ7) was employed to monitor engine parameters. Additionally, a specialized injector driver module (NI 975) was used to regulate gasoline injection quantity and pressure. The ignition timing, as well as the gasoline injection quantity and pressure, were controlled via the PiCal View tool user interface. K-type thermocouples were installed at various locations to measure temperatures accurately. The tailpipe emissions were monitored using an MRU Vario gas analyzer, capable of measuring $NO_X$, CO, $CO_2$ and oxygen emissions. The gas analyser collected data over a 5-second interval, and the average values were reported.

The experimental trials began once the engine was fully warmed up at room temperature (25° C.). The gasoline injection quantity was fixed at 6 mg. The gasoline flow rate was monitored using a fuel balance manufactured by Sierra CP Engineering, which operates based on the principle of gravity. The engine speed, throttle opening, and gasoline injection pressure were maintained at 1000 rpm, 50%, and 80 bar, respectively. All experimental trials were conducted at 12° CA and 4° CA [crankshaft angle] before top dead center (BTDC), with 4° CA BTDC identified as the optimized spark timing for the highest hydrogen flow rate.

FIGS. 6 and 7 illustrate variation in NOX emissions at different intake air pressures and temperatures. NOX emissions are significantly influenced by combustion temperature, oxygen concentration, and reaction time. Since the engine speed is constant, the effect of reaction time is negligible. The initially low NOX emission values are due to the engine operating at a low equivalence ratio. As shown in the FIGS. 6 and 7, NOX emissions increase with higher intake air temperatures. This can be attributed to the faster and more complete combustion of the rich mixture, which results in higher in-cylinder temperatures, thereby increasing NOX emissions. Conversely, NOX emissions decrease with increasing intake air pressure. For a given condition, hydrogen addition increased the NOX emission. This can be attributed to the high adiabatic flame temperature and high laminar flame speed, releasing large amounts of heat with elevated cylinder temperature, and thereby increasing the NOX emission.

FIGS. 6 and 7 represent $NO_X$ emission variation at 4° CA and 12° CA before TDC, respectively. Advanced spark timings exhibited high $NO_X$ emissions due to the increased in-cylinder temperature resulting from the enhanced combustion process. For the baseline conditions, the $NO_X$ emission at 8 LPM hydrogen flow rate at 4° C. A and 12° CA before TDC was 156 and 447 ppm, respectively. Meanwhile at 112 kPa intake air pressure, the $NO_X$ emissions reduced to 72 and 90 ppm under the same conditions reported above. However, for intake air temperature of 35° C. under same conditions, the $NO_X$ emission increased to 230 and 852 ppm, respectively.

FIG. 8 illustrates a pressure oscillation during combustion knock for the test case of 100 kPa intake air pressure and 12° CA before TDC, under room temperature and 10 LPM hydrogen flow rate. For baseline operation, the maximum hydrogen flow rates were 14 and 8 LPM at 4 and 12° CA before TDC, respectively. The intake air pressure and temperature significantly influenced the hydrogen knocking limit. The hydrogen knock limit was extended to 18 and 10 LPM for 112 kPa intake air pressure at 4 and 12° CA before TDC, respectively.

FIGS. 9 and 10 illustrate hydrogen knock limit variation at various intake air pressure and temperatures versus hydrogen flow rate at 4° CA before TDC and 12° CA before TDC, respectively. As can be seen in the FIGS. 9 and 10, the hydrogen knock limit reduced to 10 and 6 LPM for 65° C. intake air temperature at 4 and 12° CA before TDC, respectively. This is explained by the change in equivalence ratio for specific spark timing. Such phenomenon can be attributed to two primary factors: (i) air-fuel temperature and (ii) ignition delay. Knocking typically occurs when the end gas undergoes auto-ignition before the actual flame front reaches it. Elevated intake air temperatures increase the temperature of the fresh air-fuel mixture entering the combustion chamber. During the compression stroke, this already heated mixture experiences further temperature rise, significantly increasing the likelihood of auto-ignition. Additionally, the elevated intake air temperature enhances chemical reactions and accelerates combustion, reducing the ignition delay. This shortened delay raises the end-gas temperature closer to the auto-ignition point, thereby increasing the probability of knocking. In contrast, increasing the intake air pressure reduces the fuel concentration, making the combustible mixture leaner and harder to burn. This leads to slower flame propagation, thereby reducing the likelihood of knock onset. Furthermore, the lean mixture combustion delays the onset of combustion, resulting in a longer ignition delay and subsequently lowering the probability of knocking.

Based on the above studies, it is observed that the peak in-cylinder pressure and temperature decreased and increased, respectively, with rising intake air pressure and temperature, reflecting changes in the combustion process. Further, cyclic variation decreased with increasing intake air temperature but increased with rising intake air pressure. In terms of emissions, CO levels increased while $CO_2$ and $NO_X$ emissions decreased with rising intake air pressure. In contrast, the opposite trend was observed with increasing intake air temperature. Further, hydrogen addition improved performance and combustion characteristics while reducing cyclic variation. However, it resulted in a significantly higher emission of $NO_X$. It is observed that by increasing the intake air pressure and retarding the spark timing extended the hydrogen knock limit to 14 LPM and 18 LPM, respectively. Conversely, raising the intake air temperature reduced the hydrogen knock limit to 6 LPM.

The invention claimed is:

1. A system for reducing hydrogen knocking in a hydrogen internal combustion engine [H2ICE], wherein the hydrogen internal combustion engine is coupled to an intake manifold, an exhaust manifold, a forced induction unit, and a cooling unit comprising a vortex cooler and a hybrid cooler, the system comprising:
   a control unit communicatively coupled to the intake manifold, the exhaust manifold, the forced induction unit, and the cooling unit, the control unit configured to:
      route compressed air from the forced induction unit to the vortex cooler, the vortex cooler being configured to cool the compressed air and supply cold air to the intake manifold of the hydrogen internal combustion engine; and
      compare temperature of the cold air discharged by the vortex cooler against a predefined threshold temperature, wherein temperature of the cold air exceeding the predefined threshold temperature causes hydrogen knocking in the hydrogen internal combustion engine; and
   selectively operate a hybrid cooler thermally interfaced with the vortex cooler, upon determining temperature of the cold air exceeding the predefined threshold temperature,
      wherein operation of the hybrid cooler is configured to reduce temperature of the cold air below the predefined threshold temperature.

2. The system according to claim 1, wherein the hybrid cooler is thermally interfaced with the vortex cooler, the hybrid cooler comprising:
   a first cooler thermally interfaced with the vortex cooler, the first cooler including a phase change material [PCM] enhanced with carbon nanotubes [CNT], and wherein the phase change material enhanced with carbon nanotubes is configured to absorb heat generated along a periphery of the vortex cooler; and
   a second cooler, the second cooler including an ethylene glycol-water cooling module thermally interfaced with the first cooler, the ethylene glycol-water cooling module configured to absorb heat from the phase change material enhanced with carbon nanotubes.

3. The system according to claim 1, wherein the intake manifold is configured to receive hydrogen from a hydrogen supply unit.

4. The system according to claim 1, wherein the forced induction unit is a turbocharger operatively coupled to the exhaust manifold of the hydrogen internal combustion engine, and wherein a drive turbine of the turbocharger configured to be driven by exhaust gases exiting the exhaust manifold.

5. The system according to claim 1, wherein the forced induction unit is a supercharger operatively coupled to the hydrogen internal combustion engine, and wherein a drive turbine of the supercharger configured to be driven by a crankshaft of the hydrogen internal combustion engine.

6. The system according to claim 1, wherein the hydrogen internal combustion engine is a hydrogen-gasoline dual-fuel engine, and wherein the hydrogen internal combustion engine is a spark-ignition engine.

* * * * *